United States Patent

[11] 3,568,948

[72] Inventor Joel A. Burns
917 Bank of the Southwest, Amarillo, Tex. 79109
[21] Appl. No. 790,979
[22] Filed Jan. 14, 1969
[45] Patented Mar. 9, 1971

[54] DUAL FUNCTION SEAT BELT RETRACTOR
5 Claims, 10 Drawing Figs.
[52] U.S. Cl. .................................................. 242/107.4
[51] Int. Cl. ...................................................... B65h 75/48
[50] Field of Search .......................................... 242/107
(SB), 107.4, 107.5, 107.6; 297/385, 386, 388; 280/150 (SB)

[56] References Cited
UNITED STATES PATENTS
| | | | |
|---|---|---|---|
| 3,347,488 | 10/1967 | Quinting | 242/107.4 |
| 3,369,769 | 2/1968 | Burns | 242/107.4 |
| 3,412,952 | 11/1968 | Wohlert et al. | 242/107.4 |
| 3,416,747 | 12/1968 | Stoffel | 242/107.4 |
| 3,450,368 | 6/1969 | Glauser et al. | 242/107.4 |

Primary Examiner—Stanley N. Gilreath
Assistant Examiner—Werner H. Schroeder
Attorneys—Clarence A. O'Brien and Harvey B. Jacobson ABSTRACT: A rotary lock assembly comprising a base having a shaft journaled therefrom for rotation in opposite directions between a first position and a second position through a third intermediate position a predetermined number of degrees of rotation from the first position toward the second position. The assembly includes deactivatable inertia actuated lock structure operatively associated with the shaft and the base and responsive to acceleration of rotation of the shaft above a predetermined value in one direction of rotation of the shaft toward the second position to lock the shaft against further rotation in that direction. Further, the assembly includes structure responsive to disposition of the shaft in a position between the first position and the intermediate position for deactivating the locking structure.

Joel A. Burns
INVENTOR.

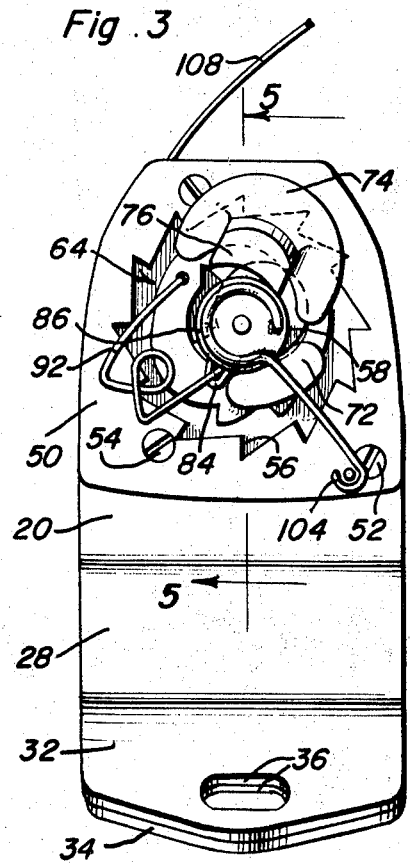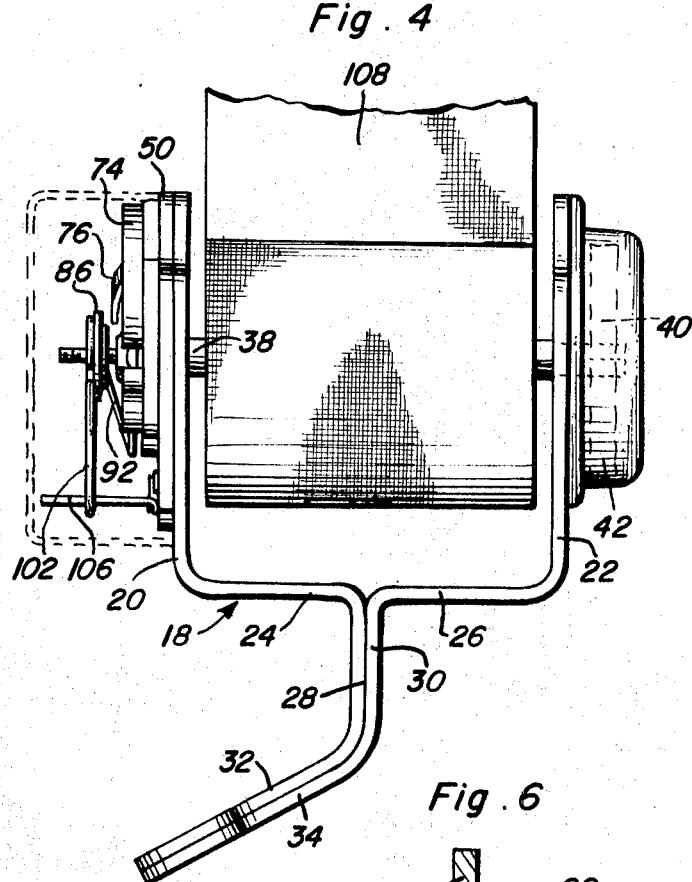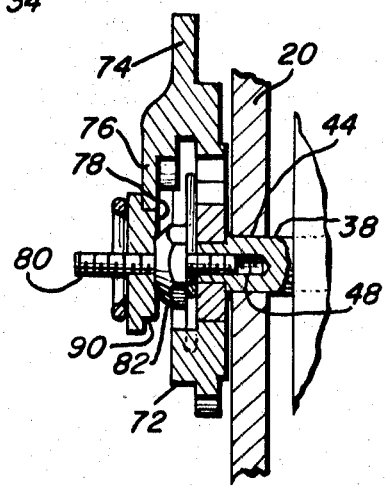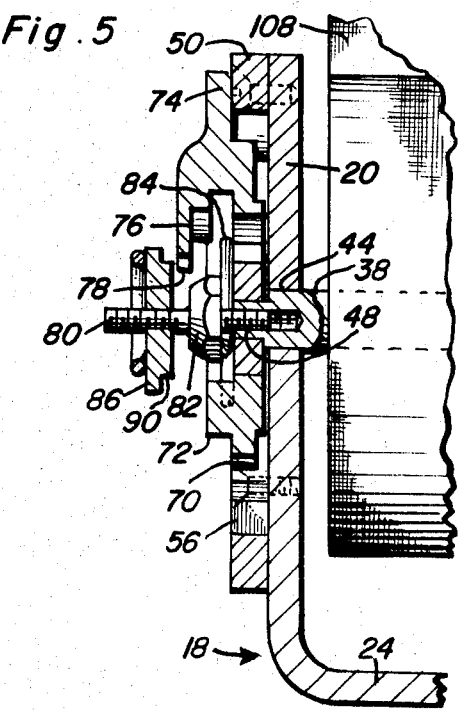
Joel A. Burns
INVENTOR.

Joel A. Burns
INVENTOR.

BY *Clarence A. O'Brien*
*and Harvey B. Jacobson*
Attorneys

DUAL FUNCTION SEAT BELT RETRACTOR

This invention relates to a novel and useful seat belt retracting and locking mechanism and more specifically to a retracting and locking mechanism for a spring-urged seat belt winding member operative in a manner to enable free winding of the associated seat belt at all times by spring action and enabling a fully wound seat belt section to be freely unwound therefrom.

There has recently been developed several types of rotary inertia locking seat belt retractors such as those disclosed in my prior U.S. Pat. Nos. 3,369,768 and 3,369,769. The seat belt retracting and locking mechanism disclosed in my first above mentioned prior patent is operative to allow free unwinding of the associated seat belt from its fully retracted position toward an intermediate position at which further protraction of the associated seat belt is terminated, unless the reel or shaft upon which the base end of the seat belt section is mounted is rotating above a predetermined speed and the retractor is further operative to prevent protraction of the seat belt once the predetermined minimum speed of rotation of the shaft occurs in any position of rotation of the shaft past the intermediate position. The retractor includes lock out means for rendering the locking structure inoperative in response to a certain predetermined portion of the associated seat belt section being wound on the shaft of the retractor.

On the other hand, my second above-mentioned prior patent discloses a seat belt retractor operative, upon high rotational speed or rapid acceleration of rotational speed of the shaft of winding member in a direction to unwind the seat belt section therefrom, to lock the winding member against further rotation in the direction unwinding the seat belt therefrom. Also, after the winding member has been locked against rotation, to unwind the seat belt by high speed rotation or rapid acceleration of rotation of the winding member, the retracting and locking mechanism of the retractor disclosed in my second mentioned above prior patent includes means by which further unwinding of the associated seat belt section may be accomplished after the winding member has been slightly rotated in a direction to wind the associated seat belt section thereon as long as the subsequent rotation of the winding member does not involve rapid rotation or rapid acceleration of rotation thereof.

While these previously patented seat belt retractors are fully operative to function in the manner in which they were designed to function, the first requires that the seat belt winding member be rotated above a predetermined minimum speed of rotation in order to allow the seat belt to be protracted beyond a predetermined partially protracted position and the second mentioned seat belt retractor enables free protraction of the associated seat belt section as long as rotation of the winding member in a direction to protract the seat belt section is not above a predetermined speed or rapidly accelerated.

The immediately above referred to operating characteristics therefore require that a seat belt section to be used be at least initially protracted in a prescribed manner. Inasmuch as some motorists and other persons using seat belts may be unfamiliar with the above-mentioned modes of operation of these previous seat belt retractors, if such persons fail to at least initially protract the seat belt sections of these previous retractors and they are unable to successfully protract the seat belt sections in order to attach them about themselves, they may be dubious of their capacity to function properly after being properly protracted or assume that they are in need of repair and not use the seat belts.

Accordingly, it is the main object of this invention to provide a rotary inertia locking seat belt retractor which will be fully operative to lock the associated winding member against further protraction after the seat belt section has been properly secured in desired protracted position and yet which will allow the seat belt section to be initially protracted in substantially any manner.

Another very important object of this invention, in accordance with the immediately preceding object, is to provide a rotary inertia locking seat belt retractor which may be readily converted from a rotary inertia responsive locking action to a substantially positive locking action, merely be the removal of a small spring.

A further object of this invention, in accordance with the immediately preceding object, is to provide a seat belt retractor which is substantially positive in its locking action after the associated seat belt has been initially protracted and which will be completely free of any form of springs which might incur fatigue and malfunction.

Another object of this invention is to provide a seat belt retractor in accordance with the preceding objects and including structural features which will enable silent retraction of the associated seat belt retractor from a fully protracted position even though a ratchet-type one-way lock mechanism is employed.

A final object of this invention to be specifically enumerated herein is to provide a seat belt retractor with automatic locking means and constructed in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an end elevational view of the retractor with the cover removed from the rotary inertia locking mechanism end thereof;

FIG. 4 is a side elevational view of the assemblage illustrated in FIG. 3 as seen from the right side thereof;

FIG. 5 is a fragmentary enlarged vertical sectional view taken substantially upon the plane indicated by the section line 5—5 of FIG. 3;

FIG. 6 is a fragmentary sectional view similar to FIG. 5 but with the lock out means in position to retain the locking member in its inoperative position;

Figure 8:
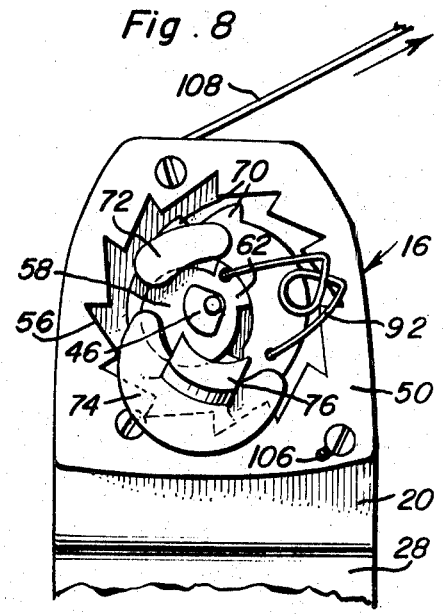
FIG. 8 is a view similar to FIG. 5 and illustrating the locking member rotated approximately 180° from the position thereof illustrated in FIG. 7 and disposed in the retracted position.
Figure 9:
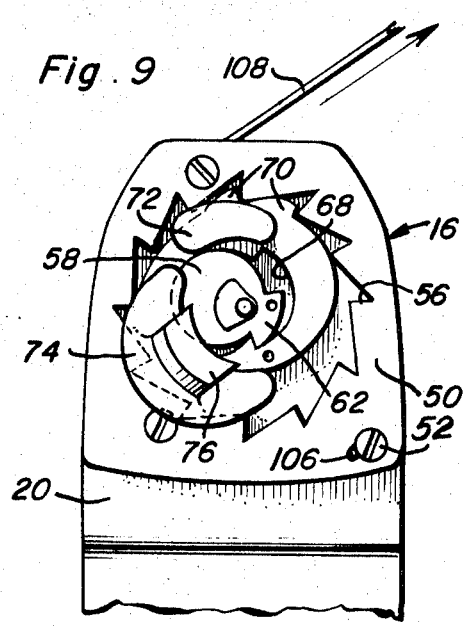
Figure 10:
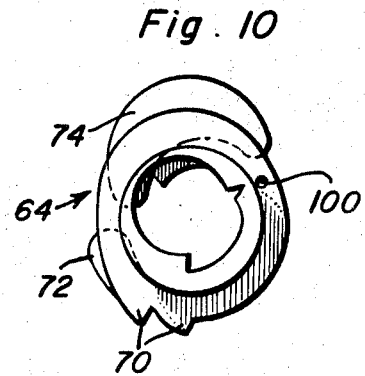

FIG. 9 is a view similar to FIG. 8 but with the spring removed and illustrating the manner in which the eccentric weighting of the lock member will cause the lock member to shift to the operative position when the heavier side of the lock member is disposed lowermost and the axis of rotation of the winding member of the retractor is horizontally disposed; and FIG. 10 is a bottom plan view of the locking member of the retractor.

Referring now more specifically to the drawings, the numeral 10 generally designates a conventional form of passenger vehicle having a seat construction generally referred to by the reference numeral 12 disposed therein and alongside of which a seat belt assembly generated referred to by the reference numeral 14 is disposed. The seat belt assembly 14 includes a retractor assembly referred to in general by the reference numeral 16 having a seat belt section 108 mounted thereon.

Figure 1:
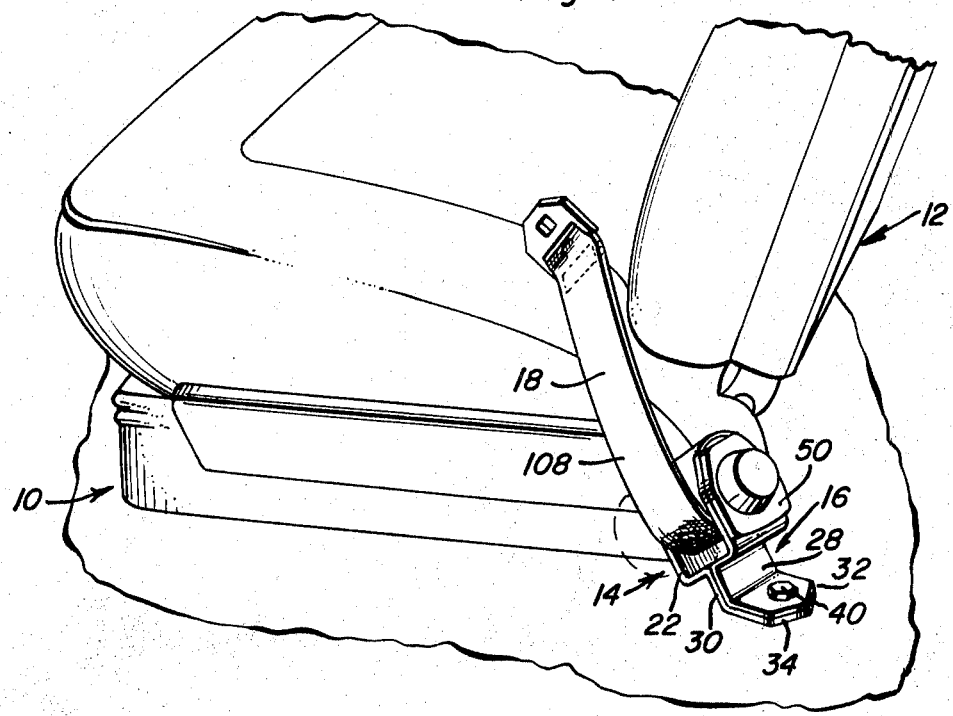
FIG. 1 is a fragmentary perspective view of a passenger seat construction of a conventional form of motor vehicle shown with the associated seat belt assembly utilizing the rotary inertia locking seat belt retractor of the instant invention.
Figure 2:
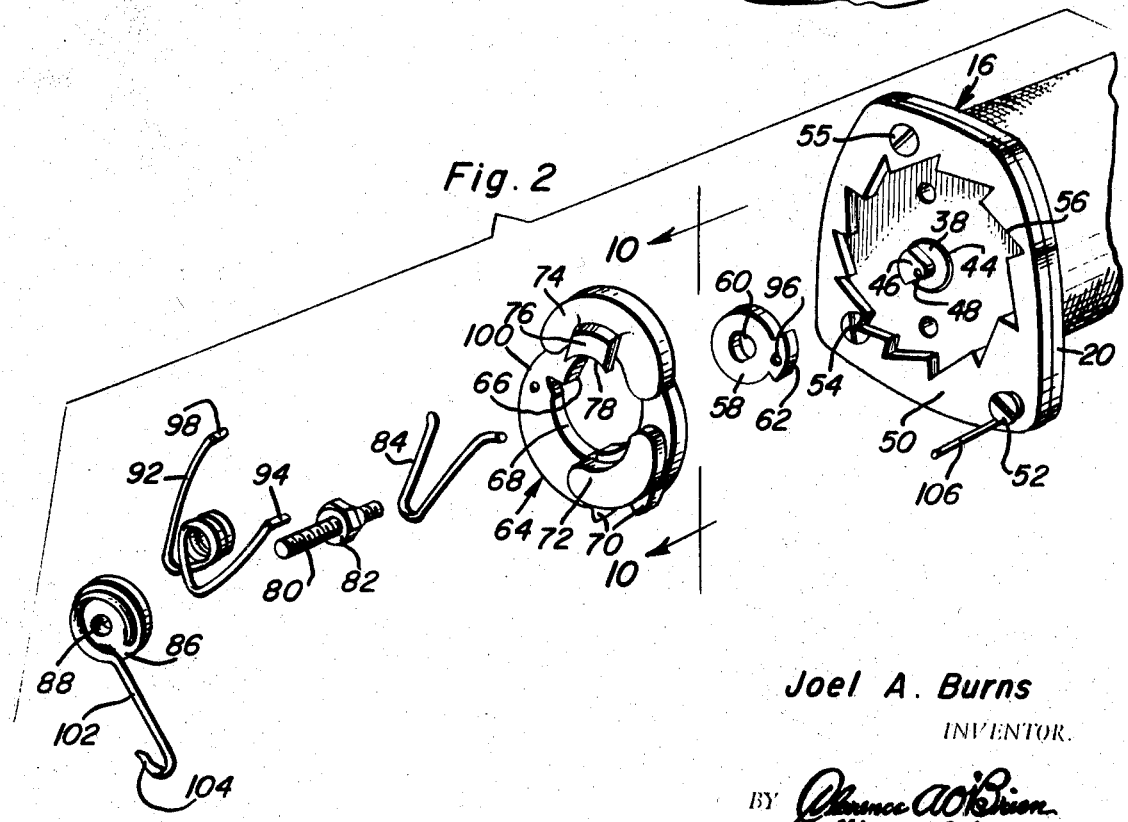
FIG. 2 is a fragmentary perspective view of the seat belt retractor with the rotary inertia locking components thereof in exploded position.
Figure 7:
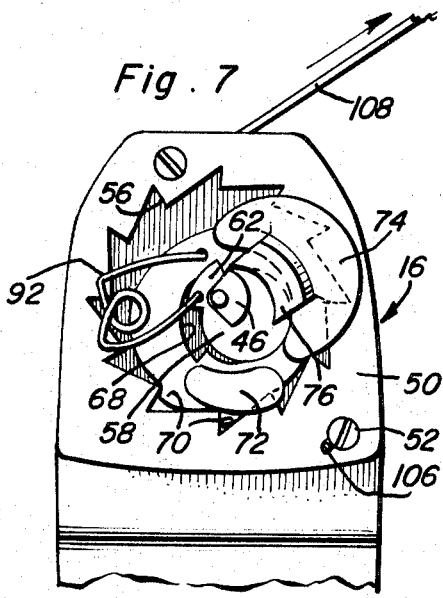
FIG. 7 is a fragmentary elevational view similar to FIG. 5 but illustrating the locking member of the retractor in its locked position.

As can best be seen from a comparison of FIGS. 1, 2 and 4 of the drawings, the retractor assembly 16 includes a frame referred to in general by the reference numeral 18 and provided with a bifurcated portion defining a pair of generally parallel end flanges or walls 20 and 22 terminating at one pair of corresponding ends in web sections 24 and 26, respectively, projecting toward each other and terminating inwardly in parallel juxtaposed upstanding flange portions 28 and 30, respectively, which in turn terminate in juxtaposed mounting flange portions 32 and 34, respectively, angulated relative to the flange portions 28 and 30. The flanges or flange portions 32 and 34 include registered apertures 36 through which a bolt 40 may be fastened in order to secure the frame 18 within the vehicle 10.

The retractor assembly 16 includes a shaft or winding member 38 which is journaled between the end flanges or walls 20 and 22. The end of the shaft 38 supported from the end wall 22 is journaled therethrough and has a torsion spring 40 operatively connected thereto and to a cover 42 therefor secured to the outer surface of the end wall 22. The torsion spring 40 is operative to rotate the shaft 38 in a counterclockwise direction as viewed in FIGS. 3 and 7—9.

The end wall 20 is provided with a bore 44 therethrough in which the corresponding end of the shaft 38 is journaled. This end of the shaft 38 includes a noncircular extension 46, see FIG. 2, on its terminal end and the extension 46 includes a threaded blind bore 48.

A framelike plate 50 is secured to the outer surface of the end wall 20 by means of suitable fasteners 52, 54 and 55 and the plate 50 defines ratchet teeth 56 concentrically disposed about the center axis of the bore 44 and which face in a counterclockwise direction. In addition, a generally cylindrical cam member 58 having a noncircular opening 60 formed therethrough complementary to the shape of the extension 46 is disposed on the extension 46. The generally cylindrical cam member 58 includes a radially outwardly projecting portion or key 62 and the cylindrical outer peripheral surfaces of the cam member 58, exclusive of the key 62, are disposed about a center eccentrically disposed relative to the center axis of the shaft 38.

A generally annular lock member referred to in general by the reference numeral 64 is provided and has a cylindrical opening 66 formed therethrough including a radial outward enlargement or recess 68 in which the key 62 of the cam member 58 is receivable. The circumferential extent of the enlargement 68 is greater than the circumferential extent of the key 62 about the cam member 58 and accordingly, relative oscillation between the key and the lock member 64 is afforded, to a limited degree.

The lock member 64 is provided with a pair of circumferentially spaced teeth 70 disposed adjacent each other in one area of its periphery and the lock member 64 includes a small weight 72 on the area of the lock member 64 upon which the teeth 70 are formed. In addition, almost a diametrically opposite portion of the lock member 64 is provided with a larger weight 74 and the weight 74 includes a tongue portion 76 which projects into the opening or bore 68 formed through the lock member 64 and terminates inwardly in an arcuate end edge portion 78.

A threaded mounting shank 80 having an abutment 82 thereon intermediate its opposite ends has one end threadedly engaged in the blind bore 48 with the cam member 58 disposed on the extension 46 between the end flange or wall 20 and the abutment 82. In addition, the locking member 64 is disposed over the cam member 58 between the abutment 82 and the end flange or wall 20. Also, a generally V-shaped anchor member 84 is embracingly disposed about the mounting shank 80 inwardly of the abutment 82 and outwardly of the cam member 58 and locking member 64.

A lockout disc 86 is provided and includes a central threaded bore 88. The lockout disc 86 is threaded on the outer end of the mounting shank 80 and includes a cylindrical peripheral edge portion 90 for a purpose to be hereinafter more fully set forth. In addition, a butterfly spring 92 is provided and has one of its angulated end portions 94 seated in a bore 96 provided therefor in the key 62 and the other angulated end portion 98 thereof seated in a bore 100 provided therefor in the locking member 64, the butterfly spring 92 serving to yieldingly urge the locking member 64 to the limit position thereof illustrated in FIG. 8 relative to the cam member 58 and to yieldingly resist rotation of the locking member to the other limit position of oscillation thereof relative to the cam member 58 illustrated in FIG. 7 of the drawings.

The lockout disc 86 includes a generally radially outwardly projecting arm 102 provided with a hooked end portion 104 on its outer end which is engageable with a wire anchor pin 106 secured to the plate 50 by means of the fastener 52, see FIG. 2.

In operation, and assuming that the seat belt section 108 anchored to the shaft 36 is in its fully retracted position, the butterfly spring 92 urges the locking member 64 to its retracted position illustrated in FIG. 8 of the drawings with the teeth 70 out of engagement with the teeth 56. Thus, the seat belt member 108 may be protracted. Once the seat belt section 108 is substantially protracted, rapid acceleration of the shaft 38 in a clockwise direction to further protract the seat belt section 108 also causes the cam member 58 to be rapidly accelerated, as it is carried by the shaft 38. The locking member 64 has a tendency (which tendency is increased by the weights 72 and 74) to cause the locking member 64 to lag behind the cam member 58 during rapid acceleration of the latter and thus the cam member 58 rotates ahead of the locking member 64 in a clockwise direction and cams that side of the locking member 64 upon which the teeth 70 are disposed outwardly toward engagement with the teeth 56, thus locking the shaft 38 against further rotation in a direction to protract the seat belt section 108. Thus, should a person secured by the seat belt structure 18 tend to continue forward movement during rapid deceleration of the vehicle 10 such as might occur during an accident, the locking member 64 will quickly, with substantially no angular displacement of the locking member 64, function terminate rotation of the shaft 38 in a clockwise direction as viewed in FIG. 8 of the drawings. Of course, the previously described operation of the seat belt structure 18 would also prevent rapid acceleration of the shaft 38 during initial protraction of the seat belt section 18. However, as previously hereinbefore set forth, this operating characteristic of a rotary inertia locking seat belt retractor is undesirable. It is for this reason that the lockout disc 86 and tongue 76 are provided.

The hooked end 104 of the arm 102 is engaged with the pin or rod 106 and thus prevents rotation of the lockout disc 86 during rotation of the mounting shank 80 as the shaft 38 is rotated. Accordingly, during rotation of the shaft 38 the lockout disc 86, by its threaded engagement with the mounting shank 80, moves along the latter.

Initially, when the seat belt section 108 is fully retracted, the lockout disc 86 is positioned as illustrated in FIG. 6 of the drawings which its diametrically reduced cylindrical peripheral edge portion 90 in radial alignment with the arcuate free edge 78 of the tongue 76 thus preventing displacement of the tongue 76 inwardly toward the mounting shank 80 and displacement of the teeth 70 outwardly from the mounting shank 80 toward engagement with the teeth 56. Thus, when the seat belt section 108 is fully retracted, the cylindrical edge or surface 90 will prevent the locking member 64 from being cammed into engagement with the teeth 56 and the shaft 38 may be rapidly accelerated during initial protraction of the seat belt section 108 without the locking member 64 shifting to the operative position. However, when the shaft 38 has been rotated a sufficient number of turns during initial protraction of the seat belt section 108, the lockout disc 86 moves outwardly along the outer end of the mounting shank 80 out of radial alignment with the tongue 76 and edge 90. At this point, rapid acceleration of the shaft 38 in a direction protracting the seat belt section 108 will cause the locking member 64 to be cammed into engagement with the teeth 56 so as to terminate rotation of the shaft 38. Of course, the hooked end 104 may be disengaged from the pin 106 by bending the arm 102 and the lockout disc 86 may be rotated relative to the mounting shank 80 before again engaging the hooked end 104 with the pin 106 so as to vary the number of turns of the shaft 38 during initial protraction of the seat belt section 108 necessary to shift the edge or surface 90 out of radial alignment with the edge of surface 78.

In addition to the spring 92 tending to maintain the locking member 64 in its inoperative position, the larger weight 74 on the locking member 64 tends to maintain the locking member 64 out of engagement with the teeth 56 in response to high rotation of the shaft 38. Of course, the larger weight 74 also tends to increase the inertia of the locking member 64 whereby a rapid increase in speed of rotation of the shaft 38 in a direction protracting the seat belt section 108 will more quickly cam the locking member 64 into engagement with the teeth 56. The small weight 72 is provided to somewhat offset the large weight 74 and it will be noted that the weights 72 and 74 are not diametrically opposite each other. In this manner, the weight represented by the small weight 72 does not offset an equal portion of the weight of the large weight 74.

If it is desired to render the seat belt retractor more sensitive to locking in response to rotation of the shaft 38 after the seat belt section 108 have been initially protracted, the spring 92 may be removed.

When the spring 92 is removed and the last-mentioned section 108 is fully retracted, the lockout disc 86 continues to function to prevent the locking member 64 from locking the shaft 38 against rotation in a direction protracting the seat belt section 108 until a predetermined protraction of the seat belt section 108 has been accomplished. Thereafter, the eccentric weighting of the locking member 64 tends to maintain the locking member 64 in the inoperative position until the seat belt section 108 has been extended the amount desired. Thereafter, after the seat belt section 108 has been buckled to the other corresponding seat belt section (not shown) and the spring 40 has been allowed to rotate the shaft 38 in the reverse direction so as to take up the slack in the seat belt section 108, subsequent protraction of the seat belt section 108 is substantially prevented, independent of rapid acceleration of the shaft 38 in a direction to unwind the seat belt section 108, inasmuch as there is inherent drag between the outer surface of the end flange or wall 20 and the opposing surface of the locking member 64 tending to have the locking member 64 lag behind during rotation of the shaft 38 in a direction to protract the seat belt section 18. This inherent friction is more predominant if the axis of rotation of the shaft 38 is disposed upright with the locking member 64 disposed above the end flange or wall 20. In addition, should the retractor assembly 16 be inverted, inherent friction between the anchor member 84 and the outer face of the locking member 64 will tend to cause the latter to lag behind the shaft 38 when the latter is rotated in a direction to protract the seat belt section 108. Further, when the shaft 38 is horizontally disposed and the various components of the retractor assembly are positioned as illustrated in FIG. 9 of the drawings which the large weight 74 in approximately the 7 o'clock position, any rotation of the shaft 38 in a clockwise direction to protract the seat belt section 108 will tend to cause the side of the locking member 64 having the teeth 70 thereon to be cammed outwardly into engagement with the teeth 56 inasmuch as the friction between the cylindrical peripheral surfaces of the cam member 58 and the opposing surfaces of the bore or opening 66 are not sufficient to elevate the large weight 74 toward the 12 o'clock position.

In review, it may be seen that the retractor assembly 16 is operative either with or without the butterfly spring 92 and that even if the operation of the retractor assembly 16 with the butterfly spring 92 is desired and the spring 92 should break or otherwise be rendered inoperative the retractor assembly 16 would be fully operative to prevent rotation of the shaft 38 in a direction to protract the seat belt section 108 after the predetermined minimum amount of seat belt section 108 has been protracted.

The lockout disc 86 prevents locking of the lock member 64 and the shaft 38 during initial protraction of the seat belt section 108 and the eccentric weighting of the lock member 64 prevents locking of the lock member 64 and the shaft 38 during rapid protraction of the section 108 after the lock out disc has been shifted axially of the mounting shank 80 to an inoperative position. Thereafter, once the protraction of the section 108 has been terminated, the inertia locking feature of the retractor is fully operative, independent of any partial retraction of the section 108 to set or cock a locking mechanism. Also, the weights 72 and 74 serve to increase the mass of the lock member 64 for more rapid inertia locking of the latter, to eccentrically weight the lock member 64 for resisting its locking during rapid rotation of the shaft 38, and to enable the lock member 64 to lock in a positive member, independent of inertia, when the spring 92 is not used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

I claim:

1. A rotary lock assembly comprising a base including first stationary abutment means, shaft means journaled from said base for rotation in one direction from a first position toward a second position, through an intermediate position a predetermined number of degrees from said first position and then rotatable in the opposite direction back toward said first position, a movable locking component defining second abutment means mounted on said shaft means for rotation therewith and supported therefrom for guided limited shifting transversely of the axis of rotation of the shaft means relative to the latter and between first and second positions with a portion of the second abutment means positioned out of and in position, respectively, in direct engagement with the first abutment means to lock said shaft means against rotation relative to said base, said shaft means and said movable component including cam surface means engageable with each other and operative, in response to torque above a predetermined value being applied to said component through said shaft means in one direction of rotation of the component thereof and substantially independent of rotation of the component with said shaft means relative to said base, to shift said component from said first position toward said second position, and lockout means responsive to positioning of said shaft means in a position between said first and intermediate positions for positively preventing movement of said component to its second position of movement, said locking component including concave abutment surface means spacing radially inwardly toward the axis of rotation of said shaft means, said lockout means including a lockout member supported from said base for limited shifting axially of said shaft means and threaded on said shaft and held against rotation relative to said base for travelling along said shaft means in response to rotation of the latter relative to said base, said lockout means including a generally cylindrical surface concentric with the axis of rotation of said shaft means and disposed in radial registry with and immediately inwardly of said abutment surface means for abutment of the latter with said cylindrical surface when said shaft is positioned between said first and intermediate positions, said lock member, when said shaft means is positioned between said intermediate and second positions, being shifted along said shaft member to a position with said cylindrical surface out of radial registry with said abutment surface, said abutment surface, during shifting of said second abutment means between said first and second positions thereof, being shifted generally radially inwardly relative to said axis for a position spaced a greater distance from said axis than said cylindrical surface to a position spaced a lesser distance from said axis than said cylindrical surface.

2. The combination of claim 1 wherein said assembly includes means operatively connected between said shaft means and said locking component yieldingly urging said component toward said first position.

3. The combination of claim 2 wherein the last-mentioned means is readily removably connected between said shaft means and locking component.

4. The combination of claim 3 wherein said last-mentioned means comprises a spring.

5. The combination of claim 1 wherein said movable locking component is eccentrically weighted relative to the axis of rotation of said shaft and the eccentric weighting of said component tends to resist shifting of said component to said second position, by centrifugal force, during rotation of said shaft at high speed.